(12) United States Patent
Abe et al.

(10) Patent No.: US 10,492,637 B2
(45) Date of Patent: Dec. 3, 2019

(54) HEATING COOKER

(71) Applicant: Panasonic Intellectual Property Management Co., Ltd., Osaka-shi, Osaka (JP)

(72) Inventors: Kuniaki Abe, Shiga (JP); Masaki Shibuya, Osaka (JP); Yuji Hayakawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 14/764,028

(22) PCT Filed: Mar. 4, 2014

(86) PCT No.: PCT/JP2014/001163
§ 371 (c)(1),
(2) Date: Jul. 28, 2015

(87) PCT Pub. No.: WO2014/136431
PCT Pub. Date: Sep. 12, 2014

(65) Prior Publication Data
US 2016/0000250 A1 Jan. 7, 2016

(30) Foreign Application Priority Data

Mar. 8, 2013 (JP) .................. 2013-047073

(51) Int. Cl.
*A47J 27/04* (2006.01)
(52) U.S. Cl.
CPC .......... *A47J 27/04* (2013.01); *A47J 2027/043* (2013.01)
(58) Field of Classification Search
CPC .. A47J 2027/043; A47J 27/04; A47J 37/0664; F24C 15/327; H05B 6/6479
(Continued)

(56) References Cited

U.S. PATENT DOCUMENTS 3,680,894 A * 8/1972 Young .................. F16L 25/14
277/616
4,991,545 A 2/1991 Rabe et al.
(Continued)

FOREIGN PATENT DOCUMENTS

CN 101152049 A 4/2008
CN 101644484 A 2/2010
(Continued)

OTHER PUBLICATIONS

English Language Translation of EP 1437547 Cited in IDS.*
(Continued)

*Primary Examiner* — Dana Ross
*Assistant Examiner* — Joseph W Iskra
(74) *Attorney, Agent, or Firm* — Brinks Gilson & Lione

(57) ABSTRACT

A steam generator includes a boiler, a water supply pipe, a drainage pipe, and a steam supply pipe. The boiler has a first side wall, a second side wall, a bottom wall, a water inlet, a drain outlet, and a steam discharge port. The water supply pipe supplies water to the boiler. The drainage extends to a drainage pipe outlet below the drain outlet by way of a curved portion thereof having a shape projecting upward from the drain outlet. The steam supply pipe supplies steam to a cavity. The bottom wall has an inner bottom surface downwardly inclined from the first side wall toward the second side wall which faces the first side wall. The water inlet is in the first side wall near the inner bottom surface, and the drain outlet is in the second side wall near the inner bottom surface and lower than the water inlet.

7 Claims, 8 Drawing Sheets

(58) Field of Classification Search
USPC ....... 392/399, 402, 441, 442, 444, 445, 446, 392/447, 448, 449, 450; 219/401, 682, 219/731; 126/20
See application file for complete search history.

(56) References Cited

U.S. PATENT DOCUMENTS

| | | | | |
|---|---|---|---|---|
| 7,049,551 | B2* | 5/2006 | Williams | F24C 7/087 |
| | | | | 126/20 |
| 7,677,271 | B2* | 3/2010 | Boettner | F16L 37/084 |
| | | | | 138/118 |
| 7,853,130 | B2* | 12/2010 | Frock | A21B 3/04 |
| | | | | 392/441 |
| 7,989,737 | B2* | 8/2011 | Jeon | A47J 27/04 |
| | | | | 126/20 |
| 2007/0183555 | A1* | 8/2007 | Kaneko | A21B 3/04 |
| | | | | 376/258 |
| 2008/0078755 | A1* | 4/2008 | Jeon | F22B 1/288 |
| | | | | 219/401 |
| 2015/0047514 | A1 | 2/2015 | Abe et al. | |

FOREIGN PATENT DOCUMENTS

| | | |
|---|---|---|
| CN | 104246374 A | 12/2014 |
| EP | 0 383 327 A1 | 8/1990 |
| EP | 1 437 547 A2 | 7/2004 |
| EP | 2 829 806 A1 | 1/2015 |
| JP | 2006-84059 A | 3/2006 |
| JP | 2007-10270 A | 1/2007 |
| JP | 2008-14553 A | 1/2008 |
| JP | 2008-164284 A | 7/2008 |
| JP | 2009-14308 A | 1/2009 |
| JP | 2010-54096 A | 3/2010 |

OTHER PUBLICATIONS

English language translation of Chinese Search Report in corresponding Chinese Application No. 2014800071683, dated Aug. 15, 2016, 2 pages.

International Search Report, and English language translation thereof, in corresponding International Application No. PCT/JP2014/001163, dated Apr. 8, 2014, 4 pages.

Extended Search Report in corresponding European Application No. 14760838.4, dated Dec. 15, 2015, 12 pages.

English language translation of Search Report in corresponding Taiwan Application No. 103107869, dated Feb. 18, 2017, 1 page.

The Result of consultation dated Feb. 5, 2018 for the related European Patent Application No. 14760838.4.

* cited by examiner

HEATING COOKER

This application is a 371 application of PCT/JP2014/001163 having an international filing date of Mar. 4, 2014, which claims priority to JP 2013-047073 filed Mar. 8, 2013, the entire contents of which are incorporated herein by reference.

TECHNICAL FIELD

The present invention relates to a heating cooker provided with a steam generator which supplies steam into a cavity.

BACKGROUND ART

As a heating cooker for cooking food which is an object to be heated by heating using microwaves or the like, there has been known a heating cooker which heats food in the cavity using steam generated by a steam generator disposed outside the cavity (refer to PTL 1, for example).

Such a steam generator includes a water supply device for supplying water into the steam generator, and a drainage device for draining water in the steam generator. For example, there has been disclosed a drainage device where the drainage is performed by making use of the siphon phenomenon which is generated due to a level difference between a drainage pipe inlet and a drainage pipe outlet (hereinafter referred to as drainage by siphoning) (refer to PTL 2, for example).

CITATION LIST

Patent Literatures

PTL 1: Unexamined Japanese Patent Publication No. 2006-84059

PTL 2: Unexamined Japanese Patent Publication No. 2010-54096

SUMMARY OF THE INVENTION

Recently, with respect to a heating cooker provided with a steam generator including a drainage device which performs the drainage by siphoning as disclosed in PTL 2, there has been a demand for draining water in the steam generator more efficiently to reduce an amount of water remaining in the steam generator after the drainage. It is an object of the present invention to solve the above-mentioned task.

A heating cooker according to the present invention includes a cavity for accommodating an object to be heated therein, and a steam generator disposed outside the cavity for supplying steam to the cavity.

The steam generator includes a boiler, a water supply pipe, a drainage pipe, and a steam supply pipe. The boiler has a first side wall, a second side wall, a bottom wall, a water inlet, a drain outlet, and a steam discharge port, and generates steam by heating water.

The water supply pipe is connected to the water inlet and supplies water to the boiler. The drainage pipe is connected to the drain outlet, extends to a drainage pipe outlet positioned below the drain outlet by way of a curved portion thereof having a shape projecting upward from the drain outlet, and drains water from an inside of the boiler. The steam supply pipe is connected to the steam discharge port, and supplies steam generated by the boiler to the cavity.

The bottom wall of the boiler has an inner bottom surface downwardly inclined from the first side wall toward the second side wall which faces the first side wall. The water inlet is formed in the first side wall in a vicinity of the inner bottom surface, and the drain outlet is formed in the second side wall at a position in the vicinity of the inner bottom surface and lower than the water inlet.

According to the present invention, the water inlet and the drain outlet of the boiler are formed in the vicinity of the bottom wall and hence, both the water inlet and the drain outlet of the boiler are always being filled with water during the generation of steam. As a result, a scale is hardly formed in the water supply pipe and the drainage pipe.

Further, according to the present invention, the inner bottom surface of the boiler is downwardly inclined from an area in the vicinity of the water supply pipe to an area in the vicinity of the drainage pipe and hence, water in the boiler flows along the inner bottom wall so that a scale stuck to or deposited on the inner wall bottom surface is forcibly washed out into the drainage pipe.

In this manner, it is possible to prevent the flow of water in the boiler from being obstructed by a scale stuck to or deposited on the inside of the boiler. As a result, the drainage can be efficiently performed in the steam generator.

DETAILED DESCRIPTION OF THE PREFERRED EMBODIMENTS

Figure 1:
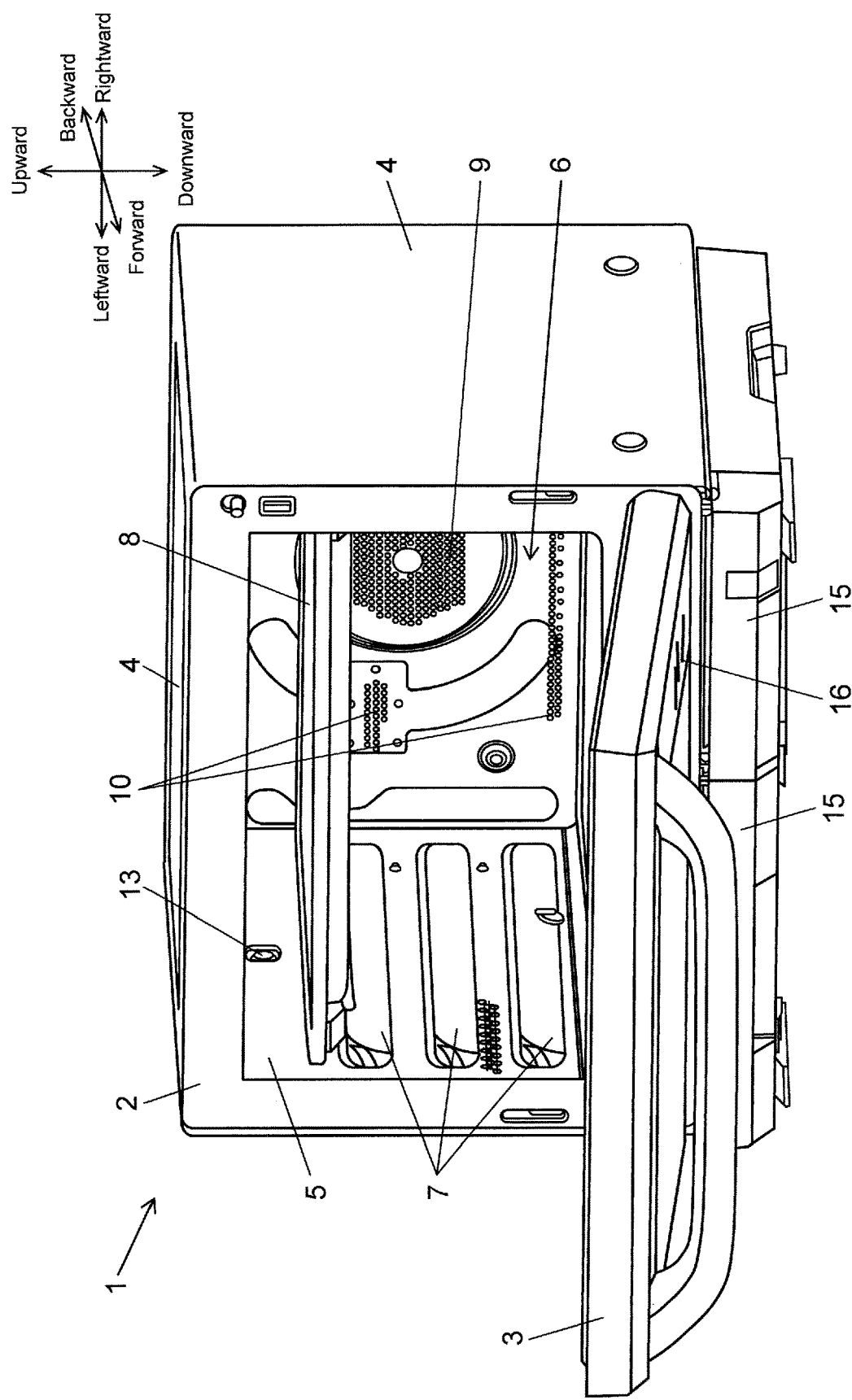
FIG. 1 is a perspective view of a heating cooker according to an exemplary embodiment of the present invention.

A heating cooker according to the first invention includes a cavity for accommodating an object to be heated therein, and a steam generator disposed outside the cavity for supplying steam to the cavity.

The steam generator includes a boiler, a water supply pipe, a drainage pipe, and a steam supply pipe. The boiler has a first side wall, a second side wall, a bottom wall, a water inlet, a drain outlet, and a steam discharge port, and generates steam by heating water.

The water supply pipe is connected to the water inlet and supplies water to the boiler. The drainage pipe is connected to the drain outlet, extends to a drainage pipe outlet positioned below the drain outlet by way of a curved portion thereof having a shape projecting upward from the drain outlet, and drains water from an inside of the boiler. The steam supply pipe is connected to the steam discharge port, and supplies the steam generated by the boiler to the cavity.

The bottom wall of the boiler has an inner bottom surface downwardly inclined from the first side wall toward the second side wall which faces the first side wall. The water inlet is formed in the first side wall in a vicinity of the inner bottom surface, and the drain outlet is formed in the second side wall at a position in the vicinity of the inner bottom surface and lower than the water inlet.

According to the present invention, the water inlet and the drain outlet of the boiler are formed in the vicinity of the bottom wall and hence, both the water inlet and the drain outlet of the boiler are always being filled with water during the generation of steam. As a result, a scale is hardly formed in the water supply pipe and the drainage pipe.

Further, according to the present invention, the inner bottom surface of the boiler is downwardly inclined from an area in the vicinity of the water supply pipe to an area in the vicinity of the drainage pipe and hence, water in the boiler flows along the inner bottom wall so that a scale stuck to or deposited on the inner wall bottom surface is forcibly washed out into the drainage pipe.

In this manner, it is possible to prevent the flow of water in the boiler from being obstructed by a scale stuck to or deposited on the inside of the boiler. As a result, the drainage can be efficiently performed in the steam generator.

The heating cooker according to the second invention is, in the first invention, characterized in that the water supply pipe includes a straight pipe portion which extends laterally from the water inlet, and the drainage pipe includes a straight pipe portion which extends laterally from the drain outlet.

According to the present invention, water which flows into the boiler from the water supply pipe flows into the drainage pipe without decreasing the energy of the water. By making use of the flow of the water, a scale in the water supply pipe and the drainage pipe and a scale stuck to or deposited on the inner wall bottom surface of the boiler can be efficiently forcibly washed out into the drainage pipe.

The heating cooker according to the third invention is, in the first invention, characterized in that the drainage pipe includes a first straight pipe portion which extends laterally from the drain outlet, and a second straight pipe portion which is connected to the first straight pipe portion and extends upward.

According to the present invention, the second straight pipe portion extends upward from the first straight pipe portion and hence, it is possible to prevent the stoppage of the siphoning function during the course of drainage by siphoning. As a result, an amount of water remaining in the boiler and the drainage pipe after the completion of the drainage can be decreased.

The heating cooker according to the fourth invention is characterized in that the steam generator further includes two heater units both of which are disposed at positions higher than the water inlet and the drain outlet.

According to the present invention, the heater is operated in a state where an amount of water necessary for generating steam is supplied to the boiler, that is, in a state where the water supply pipe and the drainage pipe are always filled with water. Accordingly, a scale is hardly formed in the water supply pipe and the drainage pipe.

The heating cooker according to the fifth invention is, in the first invention, characterized in that a height of the drainage pipe outlet is substantially equal to a height of a drainage pipe inlet.

According to the present invention, a difference between the height of the drainage pipe outlet and the height of the drainage pipe inlet is small and hence, a pressure difference between a pressure at the drainage pipe outlet and a pressure at the drainage pipe inlet which is a propulsive force for propelling the drainage is small. Accordingly, a flow speed of water in the drainage pipe can be decreased and hence, an amount of water remaining in the boiler after the drainage can be reduced.

The heating cooker according to the sixth invention is, in the first invention, characterized in that the heating cooker further includes a drainage tank which receives water drained from the drainage pipe, and the drainage pipe outlet is disposed directly above the drainage tank.

According to the present invention, water drained from the drainage pipe can directly flow to a receiving portion and hence, the efficient drainage can be realized with this simple configuration.

The heating cooker according to the seventh invention is, in the first invention, characterized in that the steam generator further includes an extension pipe connected to the drainage pipe outlet for guiding water from the drainage pipe to the drainage tank, and an inner diameter of the extension pipe is set larger than an inner diameter of the drainage pipe.

According to the present invention, the drainage water is guided by using the extension pipe connected to the drainage pipe outlet and hence, the drainage of water to the drainage tank can be performed with greater certainty.

Further, by setting the inner diameter of the extension pipe larger than the inner diameter of the drainage pipe, an opening of the drainage pipe outlet is held open even when the extension pipe is connected to the drainage pipe outlet and hence, a function of the opening as the drain outlet is maintained. Accordingly, the drainage of water to the drainage tank can be performed with greater certainty and, at the same time, the degree of freedom in design can be enhanced.

The heating cooker according to the eighth invention is, in the seventh invention, characterized in that the heating cooker further includes a drainage tank which receives water drained from the drainage pipe, and an end of the extension pipe on the downstream side is disposed directly above the drainage tank.

According to the present invention, water drained from the extension pipe can flow directly the drainage tank and hence, the efficient drainage can be realized with this simple configuration.

The heating cooker according to the ninth invention is, in the first invention, characterized in that the drainage pipe is made of a flexible resin, and the heating cooker further includes a holder which holds the drainage pipe for maintaining a shape of the drainage pipe.

According to the present invention, a resin is used as a material for forming the drainage pipe and hence, compared with a case where metal or the like is used as a material for forming the drainage pipe, a scale contained in drainage water hardly remains in the drainage pipe.

A preferred exemplary embodiment of a heating cooker according to the present invention is described in detail with reference to the drawings hereinafter. The present invention is not limited by this exemplary embodiment.

Figure 2:
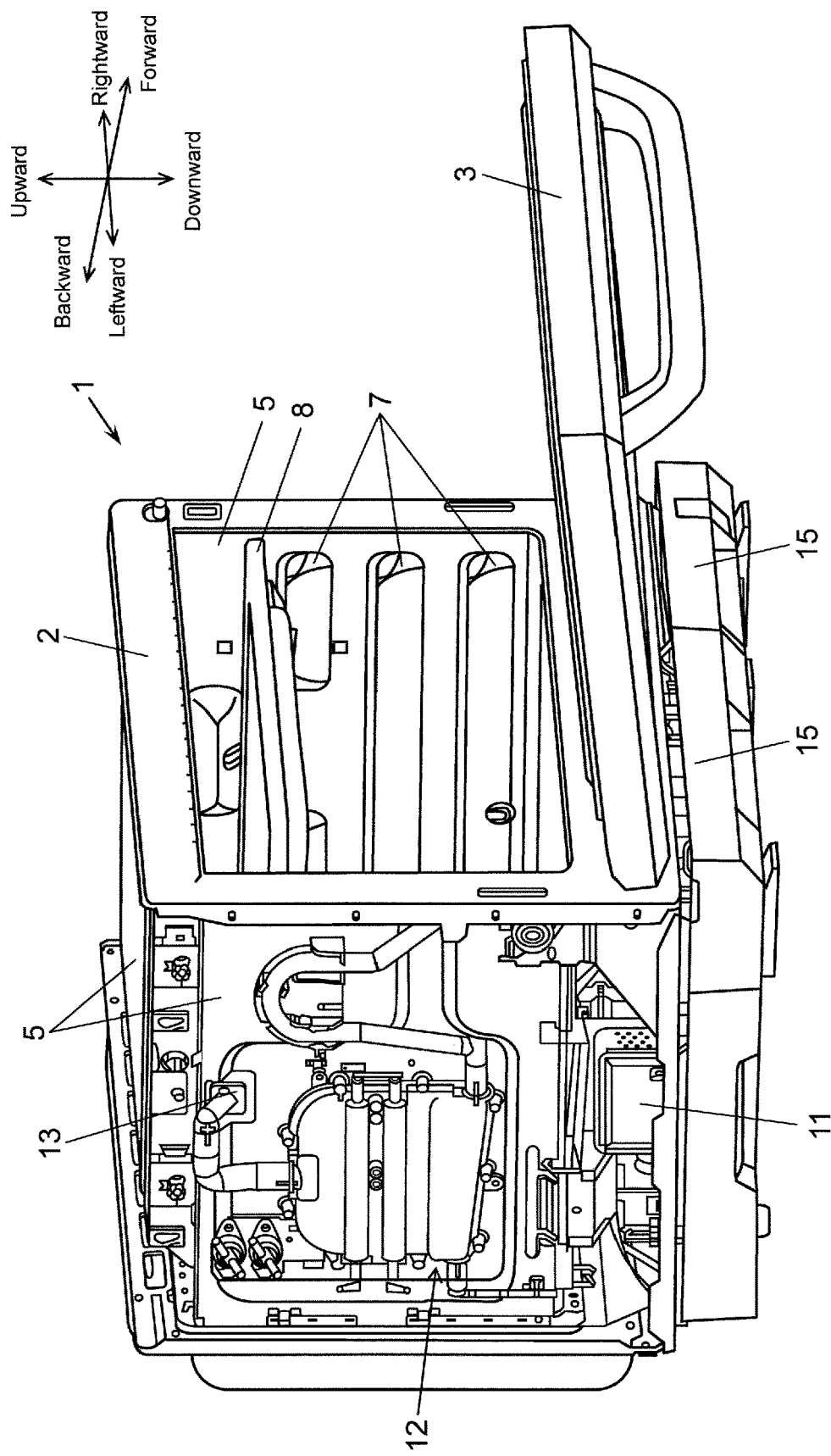
FIG. 2 is a perspective view of the heating cooker according to the exemplary embodiment.

Both FIG. 1 and FIG. 2 are perspective views showing heating cooker 1. Hereinafter, in the exemplary embodiment, the depth direction, the width direction, and the height direction of heating cooker 1 are defined as the forward and backward direction, the leftward and rightward direction, and the upward and downward direction, respectively.

As shown in FIG. 1 and FIG. 2, heating cooker 1 includes casing 2 having an opening on a front surface thereof and having an approximately rectangular parallelepiped shape, and door 3 mounted on the front surface of casing 2.

Casing 2 includes outer box 4 which forms an outer frame of casing 2, and cavity 5 formed inside outer box 4. An object to be heated such as food is accommodated in heating space 6 which is a space formed inside cavity 5 and is cooked by heating.

To allow a user to open or close the opening formed in the front surface of cavity 5 of heating cooker 1, door 3 is rotatably mounted on casing 2 about a shaft extending in the leftward and rightward direction at a lower end of the front surface of casing 2. FIG. 1 and FIG. 2 show a state where door 3 is opened. For the sake of facilitating the description, in FIG. 2, outer box 4 is not shown and an outer side wall of cavity 5 is in an exposed state.

Three rails 7 which extend in the forward and backward direction and are disposed parallel to each other are mounted on respective left and right side inner side walls of cavity 5. Rails 7 are support portions for supporting cooking tray 8 on which food is placed. By the use of these three rails 7, the height of cooking tray 8 can be adjusted in three stages. Both FIG. 1 and FIG. 2 show a state where cooking tray 8 is supported on rails 7 on an uppermost stage.

Figure 3:
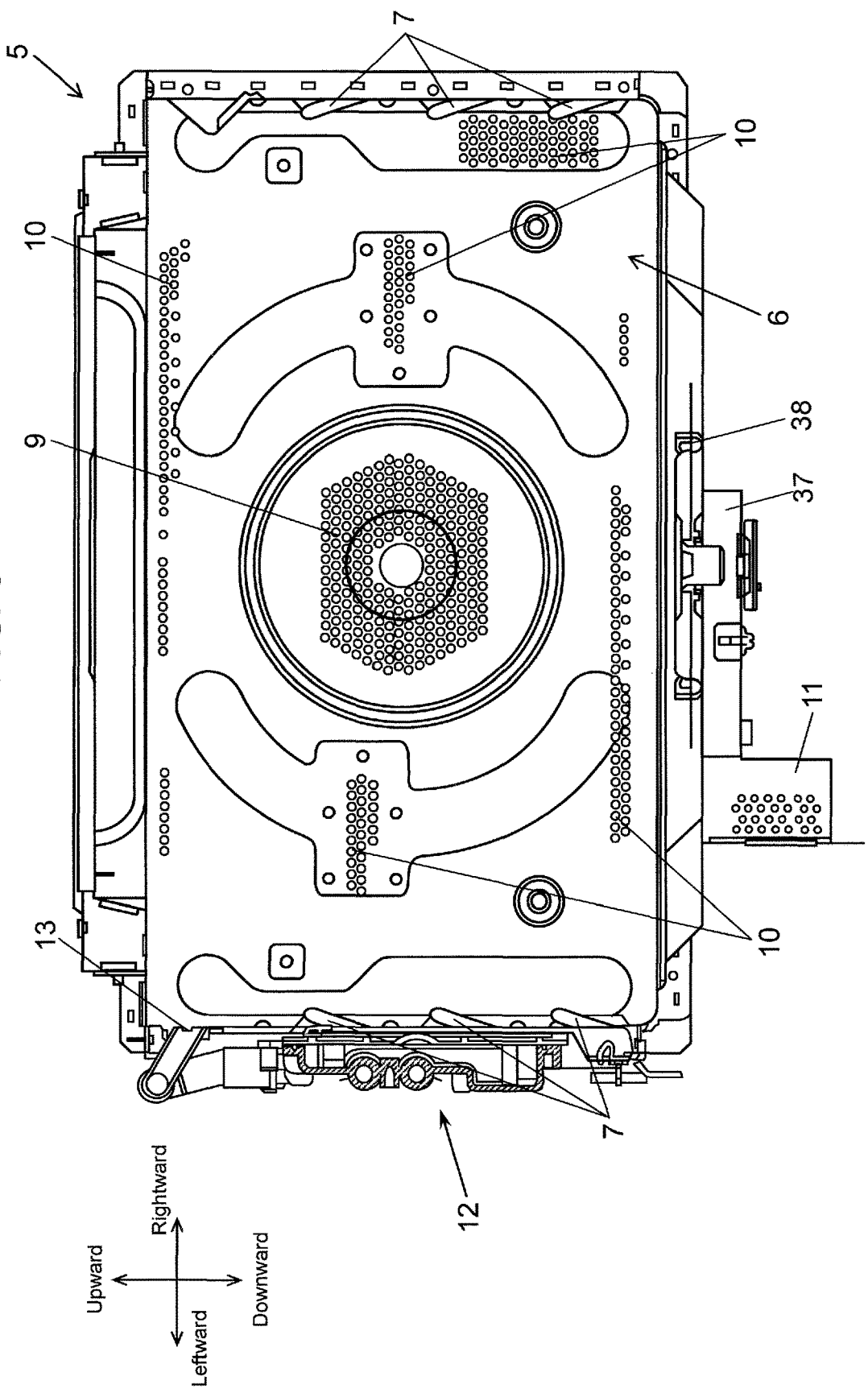
FIG. 3 is a front cross-sectional view showing the heating cooker according to the exemplary embodiment in a state where an outer box is omitted.

FIG. 3 is a front cross-sectional view showing heating cooker 1. For the sake of facilitating the description, outer box 4, door 3, a cover which covers a periphery of the opening formed on the front surface of casing 2, cooking tray 8 and the like are not shown in FIG. 3. A circulation fan and a convection unit having a heating device, both of which are not shown in the drawing, are disposed in a space formed between a rear side wall of cavity 5 and outer box 4.

As shown in FIG. 3, a plurality of suction ports 9 for hot air and a plurality of discharge ports 10 are formed in the rear side wall of cavity 5.

When the convection unit is operated, air in heating space 6 is sucked into the convection unit through suction ports 9, and is heated in the convection unit. At the same time, air heated in the convection unit is discharged to heating space 6 through discharge ports 10.

The convection unit (circulation fan, heating device), suction ports 9 and discharge ports 10 form a hot air circulation cycle for heating and circulating air in heating space 6.

As shown in FIG. 2 and FIG. 3, magnetron 11 which generates microwaves is disposed below cavity 5. Microwaves generated by magnetron 11 pass through waveguide 37 and rotary antenna 38, and pass through a bottom surface of cavity 5, and are supplied to heating space 6.

As shown in FIG. 2, steam generator 12 which generates steam by heating water is mounted on an outer side of the left side wall of cavity 5. Steam generator 12 is connected to steam injection port 13 formed in the left side wall of cavity 5, and steam generator 12 supplies steam to heating space 6 in cavity 5 through steam injection port 13. The specific configuration of steam generator 12 is described later.

As shown in FIG. 1 and FIG. 2, drain trays 15 are disposed below cavity 5. Drain trays 15 are tanks for accumulating drainage water drained from steam generator 12. In the exemplary embodiment, drain tray 15 is disposed one for each on a left side and a right side.

A water supply tank (not shown in the drawing) which stores water to be supplied to steam generator 12 is disposed behind the right drain tray 15. The water supply tank is integrally formed with right drain tray 15. Drain trays 15 are disposed so as to be slidable in the forward and backward direction and hence, when necessary, a user can drain water accumulated in drain trays 15, and can supply water to the water supply tank which is pulled out together with drain trays 15.

A control unit (not shown in the drawing) for controlling magnetron 11, steam generator 12, the circulation fan, the heating device and the like is disposed below outer box 4. In response to input signals transmitted when operation buttons 16 (see FIG. 1) which are formed on a surface of door 3 and can be selected by a user are operated, the control unit controls a cooking step of heating cooker 1 in accordance with a cooking menu stored in advance in the control unit.

In heating cooker 1 having the above-mentioned configuration, for example, when a user mounts cooking tray 8 on which food is placed on rails 7, closes door 3, and operates operation button 16 on door 3, heating cooking starts.

For example, the description is made with respect to one example of a cooking menu for performing heating cooking using microwaves. When the control unit operates magnetron 11, magnetron 11 generates microwaves. The generated microwave is supplied to heating space 6 through waveguide 37 and rotary antenna 38, and is directed to a lower surface of cooking tray 8.

In the exemplary embodiment, a heat generating element (not shown in the drawing) which absorbs microwaves and generates heat is applied by coating to the lower surface of cooking tray 8. Accordingly, food on cooking tray 8 is heated by heat generated by heat generating element.

In addition to microwaves absorbed by cooking tray 8, there are microwaves which pass through a gap formed between cooking tray 8 and the side wall of cavity 5 and reach a space above cooking tray 8. Food placed on cooking tray 8 is also heated by induction heating by such microwaves.

Next, the description is made with respect to one example of a cooking menu where heating cooking is performed by making use of circulated hot air generated by the convection unit.

When the control unit operates the heating device, air in the convection unit is heated. When the control unit operates a circulation fan, heated air in the convection unit is fed to the inside of heating space 6 through discharge port 10.

Air in heating space 6 is pushed out to the convection unit from heating space 6 through suction port 9 by air newly fed to the inside of heating space 6. Due to such circulation of hot air, food is cooked by heating.

Next, one example of a cooking menu where heating cooking is performed using steam is described.

When the control unit operates steam generator 12, steam generator 12 generates steam (saturated steam of 100 degrees or below, for example) by boiling water. Steam is supplied to heating space 6 in cavity 5 through steam injection port 13, and heating space 6 is filled with steam.

Steam filled in heating space 6 comes into contact with food and heats the food. At the same time, the food is heated by heat generated by condensation of steam.

Although the case where heating cooking is performed using cooking tray 8 is described in the exemplary embodiment, heating cooking may be performed by placing food on the bottom surface of cavity 5 without using cooking tray 8.

Hereinafter, the configuration of steam generator 12 which generates steam for heating food is described with reference to FIG. 4.

Figure 4:
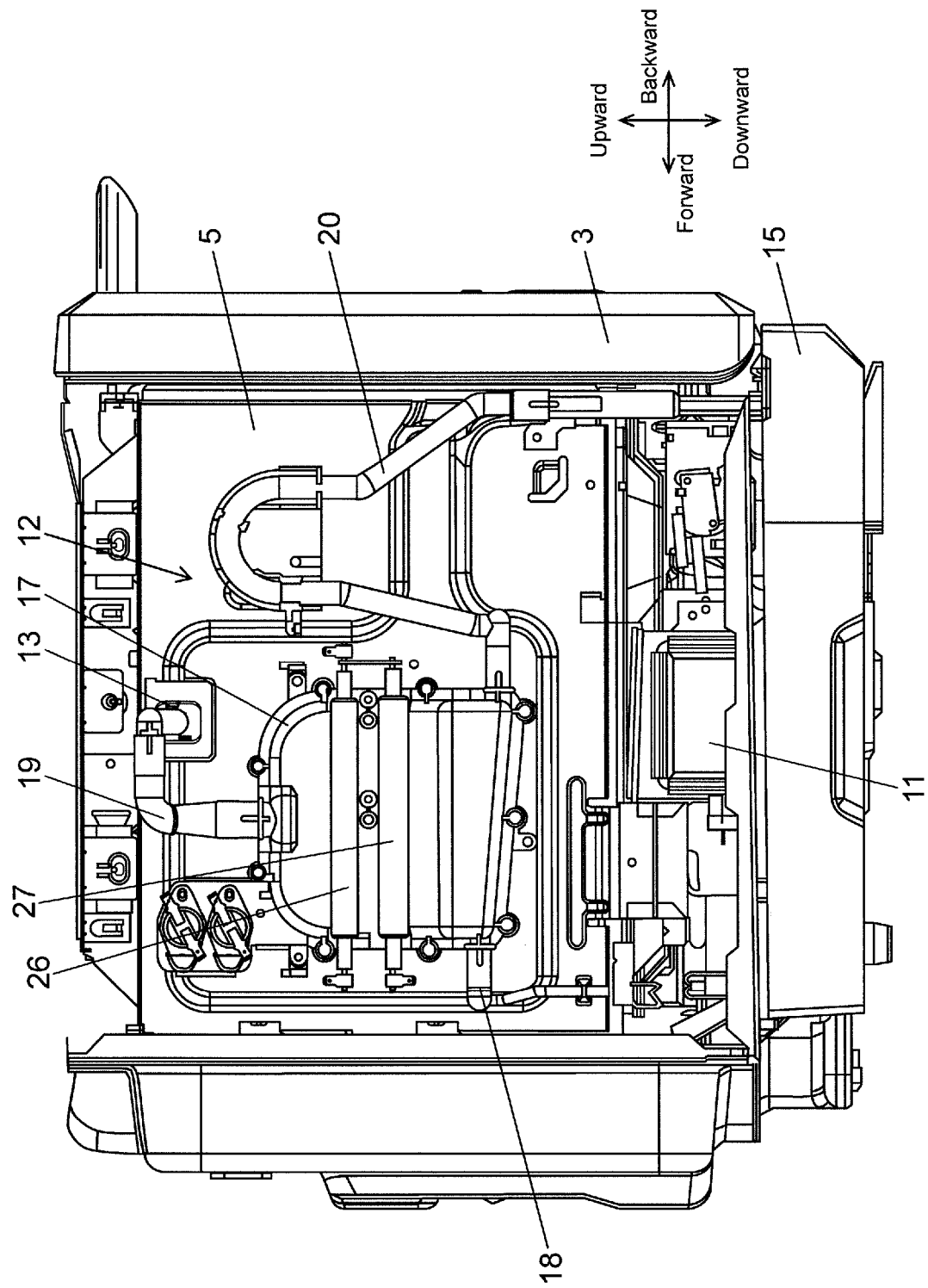
FIG. 4 is a left side view of the heating cooker according to the exemplary embodiment.

FIG. 4 is a left side view of heating cooker 1 in a state where outer box 4 is removed. As shown in FIG. 4, boiler 17 is connected to water supply pipe 18, drainage pipe 20 and steam supply pipe 19.

Water supply pipe 18 is a pipe which has an inlet thereof connected to the water supply tank (not shown in the drawing) and connects the water supply tank and boiler 17 communicably to each other, and is provided for supplying water to boiler 17. Drainage pipe 20 is a pipe which has an outlet thereof disposed above drain tray 15, and is provided for draining water in boiler 17.

Steam supply pipe 19 is a pipe which has an outlet thereof connected to steam injection port 13 formed in cavity 5 and connects boiler 17 and heating space 6 communicably to each other, and is provided for supplying generated steam to heating space 6.

For generating steam by boiling supplied water, boiler 17 includes heater unit 26 and heater unit 27 each of which has a sheath heater in the inside thereof. Heater unit 26 and heater unit 27 are horizontally disposed at positions higher than water supply pipe 18 and drainage pipe 20 but different from each other. An output of heater unit 26 is set to 350 W, and an output of heater unit 27 is set to 650 W, for example.

Hereinafter, the detailed structure of boiler 17 disposed in steam generator 12 is described with reference to FIG. 5A and FIG. 5B.

Figure 5:
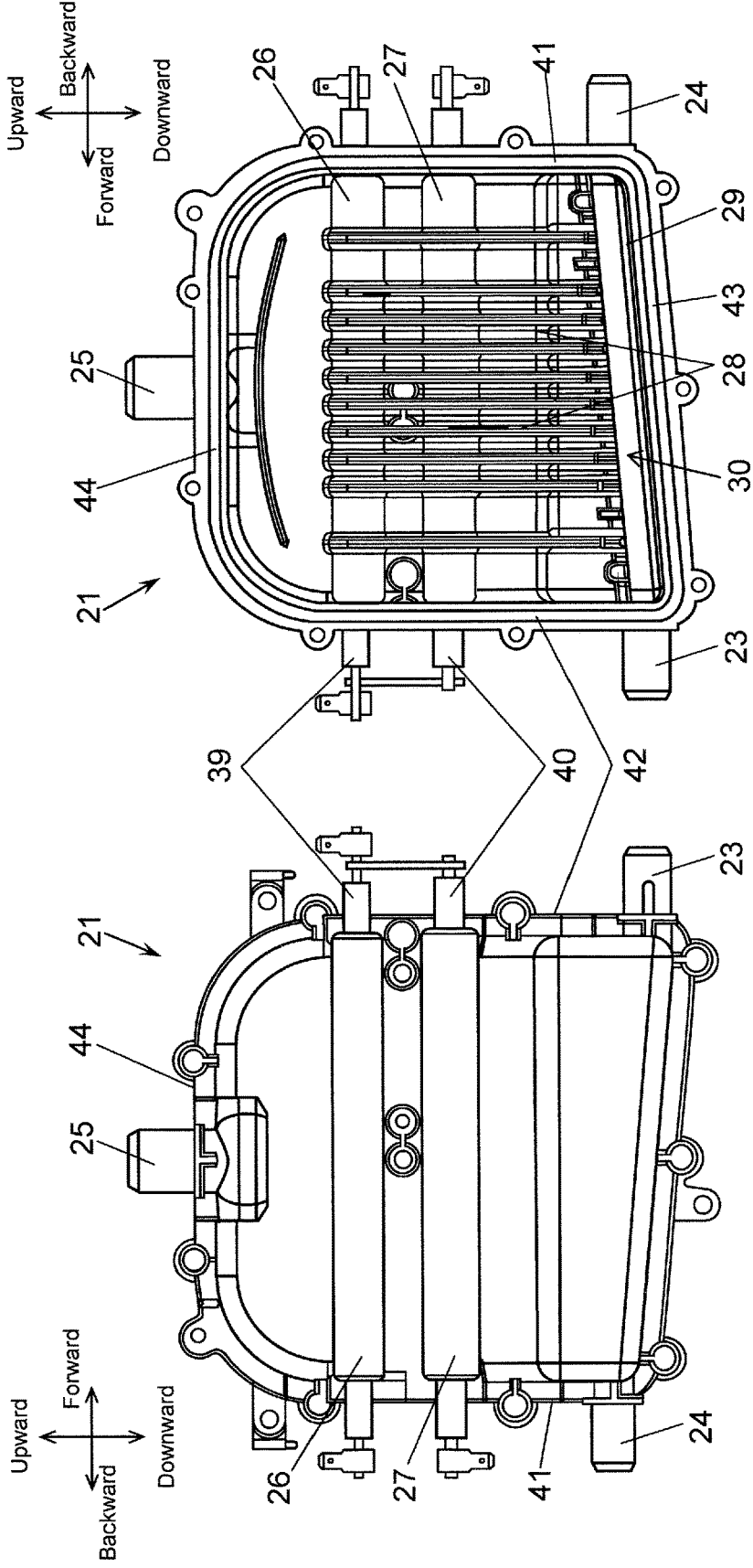
FIG. 5A is a front view of a boiler of a steam generator according to the exemplary embodiment.
FIG. 5B is a back view of the boiler of the steam generator according to the exemplary embodiment.

FIG. 5A is a front view showing the external structure of boiler body 21 which is one of two members for forming boiler 17, and FIG. 5B is a back view showing the internal structure of boiler body 21.

Boiler body 21 has rear side wall 41, front side wall 42, bottom wall 43 and ceiling 44, and has a space which can accommodate water and steam inside these walls. Rear side wall 41 corresponds to a first side wall, and front side wall 42 corresponds to a second side wall which faces the first side wall.

A boiler cover (not shown in the drawing) is mounted on boiler body 21 so as to seal the inner space of boiler body 21 thus forming boiler 17. A packing (not shown in the drawing) is mounted between boiler body 21 and the boiler cover so as to prevent a leakage of water and steam from boiler 17.

As shown in FIG. 5A and FIG. 5B, water inlet 24 which is connected to water supply pipe 18 is formed in a lower end of rear side wall 41 of boiler 17. Drain outlet 23 which is connected to drainage pipe 20 is formed in a lower end of front side wall 42 which faces rear side wall 41 of boiler 17. Steam discharge port 25 to which steam supply pipe 19 is connected is formed in a center portion of ceiling 44 of boiler 17.

Heater unit 26 and heater unit 27 are integrally formed with boiler body 21 by molding in such a state where heater unit 26 and heater unit 27 horizontally extend in the middle of in boiler 17 at different heights in the vertical direction. Sheath heater 39 is disposed in heater unit 26 in a penetrating manner, and sheath heater 40 is disposed in heater unit 27 in a penetrating manner.

To promote the transfer of heat from heater unit 26 and heater unit 27 to water, a plurality of heat transfer fins 28 are formed in the inside of boiler body 21 integrally with boiler body 21 by molding in such a state where heat transfer fins 28 are connected to heater unit 26 and heater unit 27 and extend downwardly.

In boiler 17, inner bottom surface 29 is downwardly inclined from water inlet 24 toward drain outlet 23. To promote the flow of water from water inlet 24 to drain outlet 23, bottom space 30 is formed along inner bottom surface 29 of boiler 17 below heat transfer fins 28 by terminating heat transfer fins 28 at positions away from inner bottom surface 29 by a predetermined distance.

Figure 6:
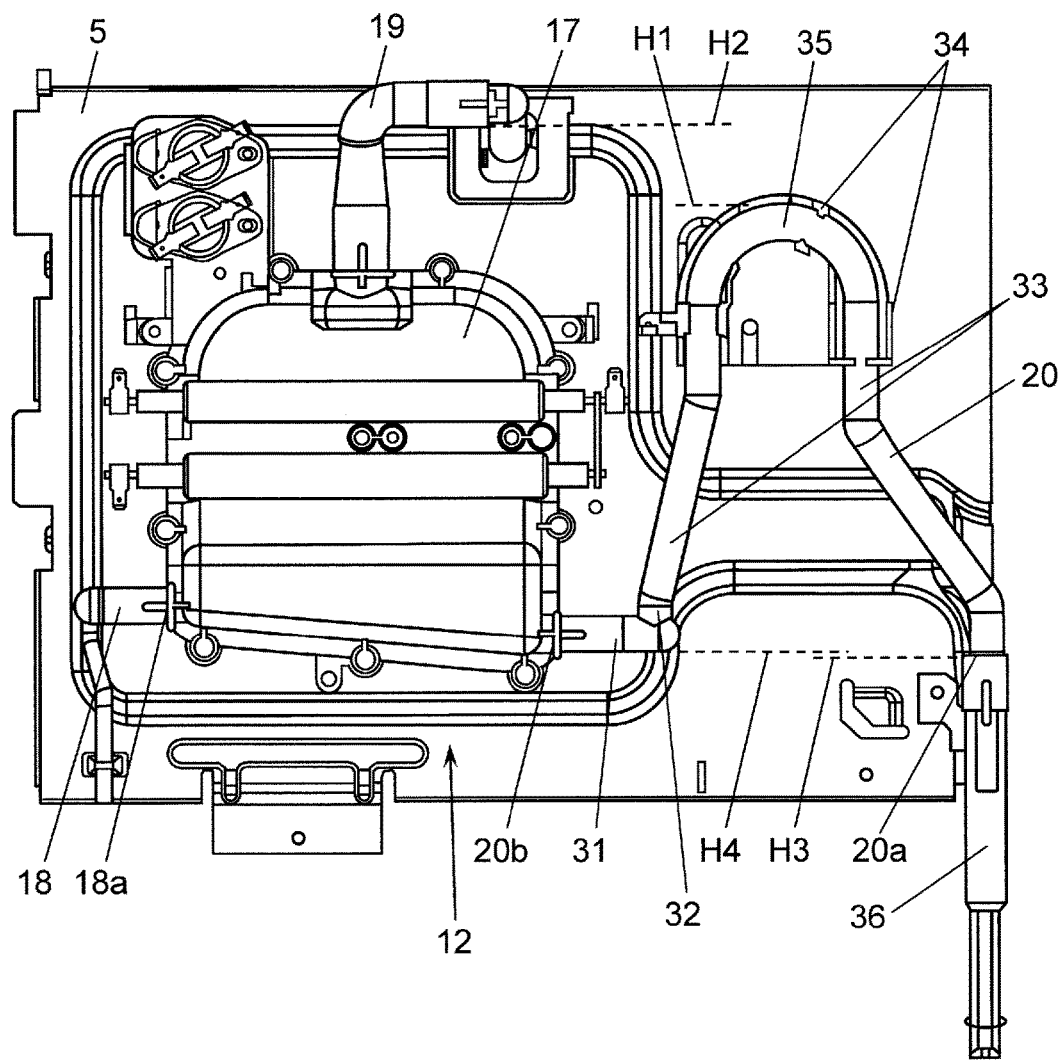
FIG. 6 is an external appearance view of the steam generator according to the exemplary embodiment.

Next, the configurations of water supply pipe 18 and drainage pipe 20 which steam generator 12 includes are described with reference to FIG. 6. FIG. 6 is an external appearance view of steam generator 12 including drainage pipe 20. As shown in FIG. 6, water supply pipe 18 is connected to the water supply tank not shown in the drawing, and is connected to water inlet 24 at straight pipe portion 22.

Drainage pipe 20 includes first straight pipe portion 31, second straight pipe portion 32, and bent pipe portion 33. First straight pipe portion 31 has drainage pipe inlet 20b connected to drain outlet 23 of boiler 17, and extends in the horizontal direction, that is, in the frontward direction of the heating cooker. Second straight pipe portion 32 extends upward from a downstream side end of first straight pipe portion 31.

To drain water in boiler 17, bent pipe portion 33 extends from a downstream side end of second straight pipe portion 32 to drainage pipe outlet 20a positioned below drain outlet 23 by way of curved portion 35 thereof having a shape projecting upward.

In the exemplary embodiment, all of first straight pipe portion 31, second straight pipe portion 32 and bent pipe portion 33 which form drainage pipe 20 are made of a flexible resin (for example, silicon). Accordingly, drainage pipe 20 includes holder 34 for maintaining a shape of drainage pipe 20. Holder 34 is mounted on an outer side wall of cavity 5, and maintains a shape of drainage pipe 20 by holding drainage pipe 20.

In drainage pipe 20 having such a configuration, as shown in FIG. 6, height H1 of an uppermost portion of bent pipe portion 33 is set lower than height H2 of an uppermost portion of steam supply pipe 19 which extends upward from boiler 17. Further, height H3 of drainage pipe outlet 20a which is a downstream side end of bent pipe portion 33 is set lower than height H4 of drainage pipe inlet 20b which is an upstream side end of first straight pipe portion 31.

Extension pipe 36 is mounted on drainage pipe outlet 20a. Extension pipe 36 is disposed directly above drain tray 15 so as to guide water drained from drainage pipe 20 to drain tray 15.

Figure 7:
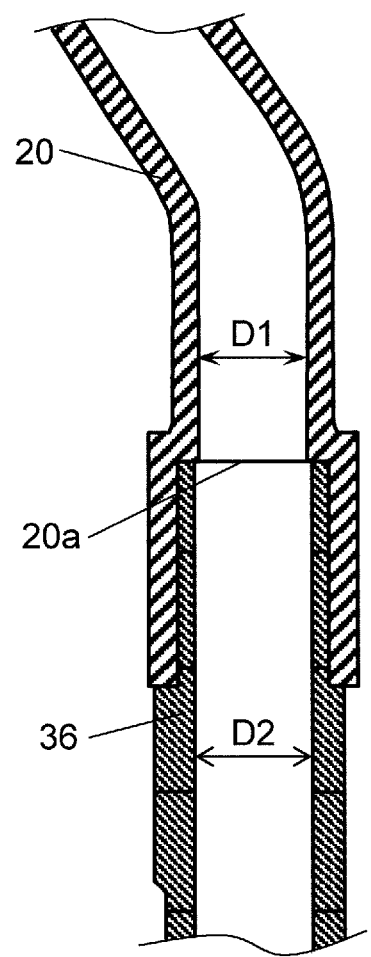
FIG. 7 is an enlarged cross-sectional view of a joint between the boiler and a drainage pipe in the steam generator according to the exemplary embodiment.

FIG. 7 is an enlarged cross-sectional view showing a joint between extension pipe 36 and drainage pipe 20. As shown in FIG. 7, in the exemplary embodiment, drainage pipe 20 has inner diameter D1 and extension pipe 36 has inner diameter D2, and inner diameter D2 of extension pipe 36 is set larger than inner diameter D1 of drainage pipe 20.

Accordingly, drainage pipe outlet 20a is held open even when extension pipe 36 is mounted on drainage pipe outlet 20a and hence, drainage pipe outlet 20a functions as a drain outlet of whole steam generator 12. In this specification, drainage pipe outlet 20a means, for example, a point where inner diameter D1 of continuous drainage pipe 20 is terminated on a downstream side.

As shown in FIG. 7, in the exemplary embodiment, an inner diameter of drainage pipe 20 is partially larger than inner diameter D1 and inner diameter D2 at the joint with extension pipe 36 and hence, drainage pipe outlet 20a is a boundary portion where the inner diameter of drainage pipe 20 changes.

Next, a method of generating steam using steam generator 12 having the above-mentioned configuration and a method of draining water are described with reference to FIG. 8A to FIG. 8D.

FIG. 8A, FIG. 8B, FIG. 8C, and FIG. 8D are views respectively showing a state of the steam generator according to the exemplary embodiment during generation of steam, a state of the steam generator at the time of starting drainage, a state of the steam generator during the drainage, and a state of the steam generator after drainage.

When a cooking menu using steam is selected in a state where the water supply tank is filled with water, firstly, the control unit starts the supply of electricity to heater unit 26 and heater unit 27 of steam generator 12 simultaneously or individually.

Then, a water level in boiler 17 is detected by using a sensor (not shown in the drawing) while operating heater unit 26 and heater unit 27. As a method of detecting a water level, for example, a method where a temperature in boiler 17 is detected, and a water level is detected based on the temperature, a method where a water level in boiler 17 is directly detected or the like can be named. However, other methods may be adopted.

When a detected water level is lower than predetermined reference water level H5 (being set to a level between the height of heater unit 26 and the height of heater unit 27 in the exemplary embodiment), a predetermined amount of water is supplied to boiler 17 from water supply pipe 18 by the control unit. On the other hand, when the detected water level is higher than predetermined reference water level H5, no water is supplied, and heating by heater units 26, 27 is continued.

Figure 8A:
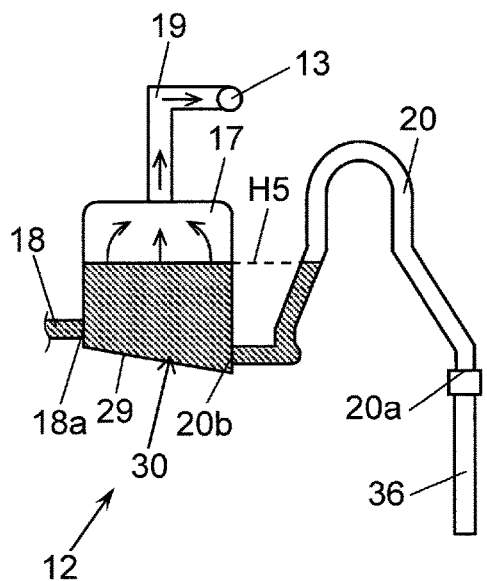
FIG. 8A is a view showing a state of the steam generator according to the exemplary embodiment in the course of generating steam.

In this manner, as shown in FIG. 8A, during a predetermined cooking time, the control unit generates steam by boiling water in boiler 17 while maintaining a water level in boiler 17 at approximately reference water level H5, and supplies the steam to heating space 6 in cavity 5 through steam supply pipe 19.

As temperatures of heater unit 26 and heater unit 27 at the time of heating, for example, heater unit 26 is set to 100° C. and heater unit 27 is set to 85° C. in a state where the water level is maintained at the reference water level. In a state where the water level is lower than the reference water level, the temperature of heater unit 26 is set to 150° C., and the temperature of heater unit 27 is set to 110° C.

In the exemplary embodiment, the height of reference water level H5 is set to a level between the height of heater unit 26 and the height of heater unit 27, and water evaporates when the water level is in the vicinity of this level.

When boiler 17 having the above-mentioned configuration is repeatedly used, a trace amount of impurities (Mg, Ca or the like) contained in water stick to or are deposited on an inner side of boiler 17, particularly, inner bottom surface 29 as a scale. When an amount of deposited scale is increased, due to a reason such as worsening of sensitivity of a sensor for detecting a water level or the like, there is a possibility that the accuracy of operation of the control unit is deteriorated eventually.

In the exemplary embodiment, when water is heated by heater unit 26 and heater unit 27, water is always filled in boiler 17 up to a water level in the vicinity of reference water level H5. Water supply pipe 18 and drainage pipe 20 are disposed at positions lower than heater unit 26 and heater unit 27 and hence, water is always filled in water supply pipe 18 and drainage pipe 20 during the generation of steam.

It is considered that a scale is formed around a place where water evaporates and hence, according to the exemplary embodiment, there is a low possibility that a scale is formed around water supply pipe outlet 18a and drainage pipe inlet 20b, and in water supply pipe 18 and drainage pipe 20.

In the exemplary embodiment, drainage by siphoning is performed so as to discharge a scale stuck to or deposited on the inside boiler 17. To be more specific, when the control unit instructs the supply of water, water is supplied to boiler 17 from water supply pipe 18 so that a water level in boiler 17 and water level in drainage pipe 20 are elevated.

Figure 8C:
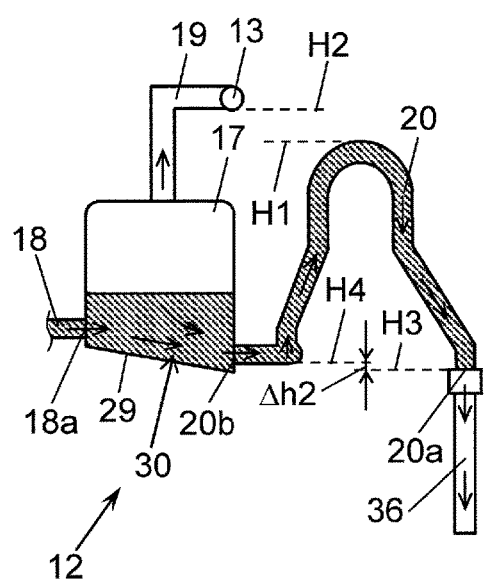
FIG. 8C is a view showing a state of the steam generator according to the exemplary embodiment in the course of the drainage.
Figure 8B:
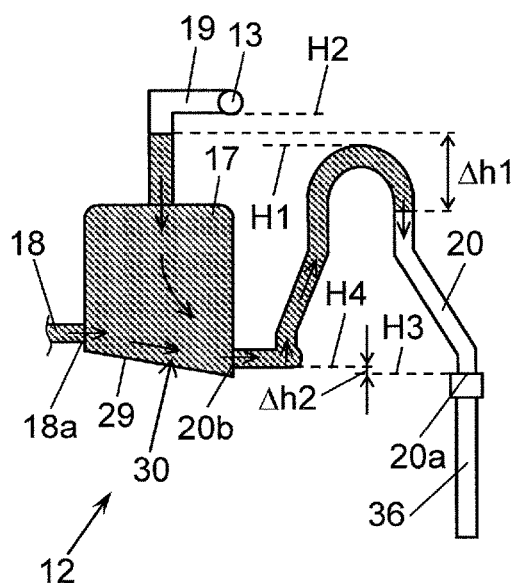
FIG. 8B is a view showing a state of the steam generator according to the exemplary embodiment at the time of starting the drainage.

As shown in FIG. 8B, height H1 of the uppermost portion of drainage pipe 20 is lower than height H2 of the uppermost portion of steam supply pipe 19. Accordingly, before a water surface in steam supply pipe 19 reaches the uppermost portion of steam supply pipe 19, a water surface in drainage pipe 20 passes the uppermost portion of drainage pipe 20, and the height of the water surface in steam supply pipe 19 and the height of the water surface in drainage pipe 20 start to become different from each other.

When the level difference Δh1 is generated between the water surface in steam supply pipe 19 and the water surface in drainage pipe 20, due to a siphon phenomenon, as shown in FIG. 8C, water accumulated in boiler 17 and drainage pipe 20 starts to flow toward drainage pipe outlet 20a at a stretch.

As shown in FIG. 5B, in exemplary embodiment, inner bottom surface 29 of boiler 17 is downwardly inclined from water inlet 24 toward drain outlet 23.

Accordingly, as shown in FIG. 8B and FIG. 8C, a strong water flow which is directed toward drain outlet 23 is generated in boiler 17 along inner bottom surface 29. By making use of such a water flow, a scale stuck to or deposited on the inside of boiler 17, particularly, inner bottom surface 29 can be discharged from boiler 17. In this manner, the inside of boiler 17 is cleaned.

Water which enters drainage pipe inlet 20b flows through the inside of drainage pipe 20 in order of first straight pipe portion 31, second straight pipe portion 32 and bent pipe portion 33. A flow speed of water in drainage pipe 20 depends on level difference Δh2 between height H4 of drainage pipe inlet 20b and height H3 of drainage pipe outlet 20a. That is, the larger level difference Δh2, the faster a flow speed of water in drainage pipe 20 becomes.

In the case where a flow speed of water in drainage pipe 20 is fast, when drainage by siphoning progresses so that an amount of water remaining in boiler 17 becomes small, air bubbles are easily generated inside boiler 17. When air bubbles reach bent pipe portion 33 and curved portion 35 is filled with air, a function of the siphon is lost so that the drainage by siphoning is finished.

In the exemplary embodiment, to suppress a flow speed of water in drainage pipe 20, level difference Δh2 is set to a value as small as possible. For example, level difference Δh2 is set to a value not larger than a diameter of drainage pipe outlet 20a. Further, by forming large curved portion 35 on drainage pipe 20, a larger resistance is applied to water so that a drainage speed of water in drainage pipe 20 can be further suppressed.

Water drained from drainage pipe outlet 20a is guided by extension pipe 36, and reaches drain tray 15. Extension pipe 36 is disposed directly above drain tray 15 and hence, water drained from extension pipe 36 does not scatter to the outside of drain tray 15.

When water flows through drainage pipe 20, a scale contained in drainage water may stick to an inner wall of drainage pipe 20. In the exemplary embodiment, drainage pipe 20 made of a resin is used and hence, compared with a case where a drainage pipe made of metal such as copper is used, an amount of scale stuck to the inside of drainage pipe 20 is small.

In the exemplary embodiment, during the drainage, the supply of water is simultaneously performed. As shown in FIG. 8B and FIG. 8C, water supplied to boiler 17 through water supply pipe 18 flows toward drainage pipe inlet 20b from water supply pipe outlet 18a along inner bottom surface 29 of boiler 17. Accordingly, the flow of water toward drainage pipe 20 along inner bottom surface 29 of boiler 17 is formed so that the discharging of a scale is accelerated.

In the exemplary embodiment, to surely generate a siphon phenomenon when a water surface in drainage pipe 20 exceeds the uppermost portion of drainage pipe 20, a water supply amount (for example, 100 cc) for starting drainage is set.

Various modes are considered with respect to the supply of water for starting drainage such as a mode where the supply of water is automatically performed for each step in a cooking menu and a mode where the supply of water is performed in response to a manipulation by a user, for example. The supply of water can be performed at desired timing.

Figure 8D:
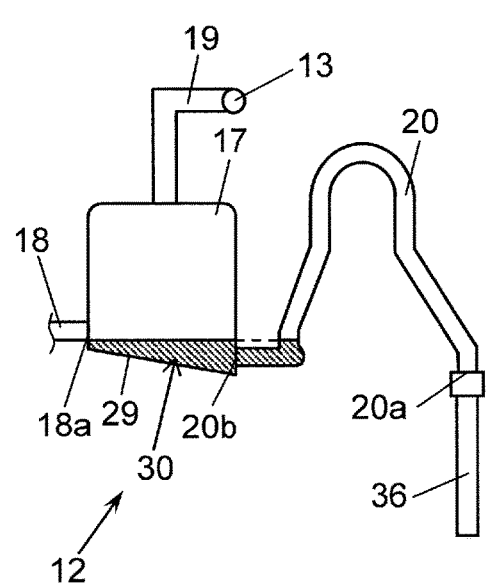
FIG. 8D is a view showing a state of the steam generator according to the exemplary embodiment after the drainage.

As a final step, as shown in FIG. 8D, the drainage is completed in a state where water remains in bottom space 30 in boiler 17 and in first straight pipe portion 31 of drainage pipe 20.

In the exemplary embodiment, first straight pipe portion 31 is connected to drainage pipe inlet 20b in a state where first straight pipe portion 31 extends in the horizontal direction from drainage pipe inlet 20b, and second straight pipe portion 32 is connected to first straight pipe portion 31 in a state where second straight pipe portion 32 extends in the vertical direction from first straight pipe portion 31. With this configuration, eventually, an amount of water remaining in boiler 17 and drainage pipe 20 is decreased. Hereinafter, a logic is described which is considered as the reason that an amount of water can be decreased.

As described above, the exemplary embodiment adopts the configuration which suppresses a flow speed of water in drainage pipe 20. However, when drainage by siphoning progresses so that an amount of water remaining in boiler 17 becomes small, the generation of a certain amount of air bubbles starts in boiler 17 and the air bubbles enter drainage pipe 20.

For example, compared with a case where drainage pipe inlet 20b and bent pipe portion 33 are connected to each other by way of a bent pipe portion having an arc shape of a large curvature, according to the exemplary embodiment, it is considered that air bubbles which enter drainage pipe inlet 20b more hardly reach bent pipe portion 33 from drainage pipe inlet 20b after passing through a joint between first straight pipe portion 31 and second straight pipe portion 32.

As a result, it is possible to prevent a siphon function from being lost in the course of the drainage by siphoning and hence, after the drainage, an amount of water remaining in boiler 17 and drainage pipe 20 is decreased.

As described above, according to the exemplary embodiment, by performing the drainage by siphoning, a scale which is formed and deposited in boiler 17 can be discharged together with water in boiler 17. In this manner, the inside of boiler 17 is held in a clean state and hence, the deterioration of accuracy in the operation of the control unit can be prevented.

The present invention is not limited to the above-mentioned exemplary embodiment, and various modifications are conceivable.

For example, in the exemplary embodiment, first straight pipe portion 31 of drainage pipe 20 extends in the horizontal direction from drainage pipe inlet 20b, and second straight pipe portion 32 of drainage pipe 20 extends in the vertical direction from first straight pipe portion 31.

However, even if a bent pipe portion is formed between first straight pipe portion 31 and second straight pipe portion 32, provided that a curvature of the bent pipe portion is sufficiently small, advantageous effects substantially equal to the advantageous effects of the exemplary embodiment can be acquired.

First straight pipe portion 31 does not necessarily extend in the completely horizontal direction from drainage pipe inlet 20b. It is sufficient for first straight pipe portion 31 to extend laterally. In the same manner, second straight pipe portion 32 does not also necessarily extend in the completely vertical direction from first straight pipe portion 31. It is sufficient for second straight pipe portion 32 to extend upward.

In the exemplary embodiment, extension pipe 36 is connected to drainage pipe outlet 20a. However, extension pipe 36 is not always necessary. When extension pipe 36 is not used, water from drainage pipe outlet 20a can be directly forcibly flown into drain tray 15 by disposing drainage pipe outlet 20a directly above drain tray 15.

By suitably combining desired exemplary embodiments out of the above-mentioned various embodiments, the combination can acquire advantageous effects that the desired exemplary embodiments acquire respectively.

INDUSTRIAL APPLICABILITY

The present invention is applicable to a heating cooker which cooks food by heating using steam. For example, the present invention is applicable to an oven or a microwave oven having an oven function.

What is claimed is:
1. A heating cooker comprising:
a cavity configured to accommodate an object to be heated therein; and
a steam generator disposed outside the cavity and configured to supply steam to the cavity, the steam generator including:
a boiler having a first side wall, a second side wall, a bottom wall, a water inlet, a drain outlet, two heater units both of which are disposed at positions higher than the water inlet and the drain outlet, and reside on either side of a reference water level in the boiler, and a steam discharge port, the boiler configured to generate steam by heating water;
a water supply pipe connected to the water inlet and configured to supply water to the boiler;
a drainage pipe connected to the drain outlet and extending to a drainage pipe outlet below the drain outlet by way of a curved portion thereof having a shape projecting upward from the drain outlet to an uppermost portion and downward therefrom, such that the drainage pipe drains water from an inside of the boiler;
wherein the water supply pipe includes a straight pipe portion that extends laterally from the water inlet, and the drainage pipe includes a straight pipe portion that directly extends laterally from the drain outlet; and a steam supply pipe connected to the steam discharge port and configured to supply the steam generated by the boiler to the cavity, wherein the bottom wall of the boiler has an inner bottom surface downwardly inclined from the first side wall toward the second side wall which faces the first side wall, the water inlet is in the first side wall in a vicinity of the inner bottom surface, and the drain outlet is in the second side wall at a position in the vicinity of the inner bottom surface and lower than the water inlet.

2. The heating cooker according to claim 1, wherein the drainage pipe includes a first straight pipe portion that extends laterally from the drain outlet, and a second straight pipe portion that is connected to the first straight pipe portion and extends upward.

3. The heating cooker according to claim 1, wherein a height of the drainage pipe outlet is substantially equal to a height of a drainage pipe inlet.

4. The heating cooker according to claim 1, further comprising a drainage tank configured to receive water drained from the drainage pipe, wherein the drainage pipe outlet is directly above the drainage tank.

5. The heating cooker according to claim 4, wherein the steam generator further includes an extension pipe connected to the drainage pipe outlet and configured to guide water from the drainage pipe to the drainage tank, and an inner diameter of the extension pipe is larger than an inner diameter of the drainage pipe.

6. The heating cooker according to claim 5, wherein an end of the extension pipe on a downstream side is directly above the drainage tank.

7. The heating cooker according to claim 1, wherein the drainage pipe is made of a flexible resin, and the heating cooker further comprises a holder configured to hold the drainage pipe to maintain a shape of the drainage pipe.

* * * * *